(12) United States Patent
Yokoyama et al.

(10) Patent No.: US 9,202,599 B2
(45) Date of Patent: Dec. 1, 2015

(54) OPERATIONAL SUPPORT DEVICE AND OPERATIONAL SUPPORT METHOD FOR A NUCLEAR POWER PLANT

(75) Inventors: Masanori Yokoyama, Tokyo (JP); Koji Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 449 days.

(21) Appl. No.: 13/383,668

(22) PCT Filed: Oct. 25, 2010

(86) PCT No.: PCT/JP2010/068816
§ 371 (c)(1),
(2), (4) Date: Jan. 12, 2012

(87) PCT Pub. No.: WO2011/052524
PCT Pub. Date: May 5, 2011

(65) Prior Publication Data
US 2012/0121055 A1 May 17, 2012

(30) Foreign Application Priority Data
Oct. 29, 2009 (JP) ................................. 2009-249198

(51) Int. Cl.
G21C 17/00 (2006.01)
G21D 3/00 (2006.01)
G21C 7/36 (2006.01)

(52) U.S. Cl.
CPC *G21D 3/008* (2013.01); *G21C 7/36* (2013.01); *Y02E 30/40* (2013.01)

(58) Field of Classification Search
CPC .................................. G21D 3/008; G21C 7/36
USPC ........................................... 376/216, 217, 259
See application file for complete search history.

(56) References Cited

U.S. PATENT DOCUMENTS 4,585,609 A * 4/1986 Le Rat ........................... 376/259
4,586,144 A 4/1986 Fukumoto
(Continued)

FOREIGN PATENT DOCUMENTS

JP 58-120195 A 7/1983
JP 59-13993 A 1/1984
(Continued)

OTHER PUBLICATIONS

International Search Report of PCT/JP2010/068816, date of mailing Jan. 25, 2011.
(Continued)

*Primary Examiner* — Jack W Keith
*Assistant Examiner* — Daniel Wasil
(74) *Attorney, Agent, or Firm* — Westerman, Hattori, Daniels & Adrian, LLP

(57) ABSTRACT

Provided are an operation support device and an operation support method for a nuclear power plant which are capable of accurately grasping the condition of a nuclear power plant and capable of offering support for instantly performing a predetermined operation by an operator when an unusual situation occurs. The operation support device for a nuclear power plant is provided with an operation state check display unit (20) for displaying whether or not a system or equipment necessary for a safe operation of the entire nuclear power plant operates on the basis of a command signal to the system or equipment and a bypass and operation impossibility state display unit (21) for displaying whether the system or equipment is operable or not.

6 Claims, 3 Drawing Sheets

(56) References Cited

U.S. PATENT DOCUMENTS

| | | | | |
|---|---|---|---|---|
| 4,740,349 A | * | 4/1988 | Loftus et al. | 376/259 |
| 4,853,175 A | * | 8/1989 | Book | 376/216 |
| 4,902,469 A | * | 2/1990 | Watson et al. | 376/259 |
| 5,267,277 A | * | 11/1993 | Scarola et al. | 376/259 |
| 5,315,502 A | | 5/1994 | Koyama et al. | |
| 5,361,198 A | * | 11/1994 | Harmon et al. | 376/216 |
| 5,394,447 A | | 2/1995 | Scarola et al. | |
| 5,617,311 A | * | 4/1997 | Easter et al. | 376/259 |
| 5,812,622 A | * | 9/1998 | Chang et al. | 376/259 |
| 5,859,885 A | * | 1/1999 | Rusnica et al. | 376/259 |
| 5,892,440 A | * | 4/1999 | Bryan | 340/525 |
| 2004/0136487 A1 | * | 7/2004 | Shin et al. | 376/259 |

FOREIGN PATENT DOCUMENTS

| | | |
|---|---|---|
| JP | 59-17609 A | 1/1984 |
| JP | 61-16307 A | 1/1986 |
| JP | 62-75719 A | 4/1987 |
| JP | 3-156508 A | 7/1991 |
| JP | 11-231909 A | 8/1999 |
| JP | 11-327631 A | 11/1999 |
| JP | 2000-249782 A | 9/2000 |
| JP | 2004-529353 A | 9/2004 |

OTHER PUBLICATIONS

Decision to Grant a Patent dated Jun. 2, 2015, issued in corresponding Japanese Patent Application No. 2009-249198 "The Decision to Grant a Patent has been received" (3 pages).

Japanese Office Action dated Oct. 7, 2014, issued in Japanese Patent Application No. 2009-249198, w/ English translation (5 pages).

Extended European Search Report Dated Oct. 5, 2015, issued in counterpart European Patent Application No. 10826656.0 (6 page).

* cited by examiner

FIG. 3

| | | |
|---|---|---|
| RT | – | NG |
| TT | OK | – |
| GT | NG | – |
| SI | – | NG |
| BO | – | – |
| φA | – | – |
| CVI | – | – |
| CR ISOL | – | – |
| φB | – | – |
| CS | – | – |
| FW Iso | – | – |
| MS Iso | – | – |
| A F/W Pmp Act | – | – |

20    21

OPERATIONAL SUPPORT DEVICE AND OPERATIONAL SUPPORT METHOD FOR A NUCLEAR POWER PLANT

TECHNICAL FIELD

The present invention relates to an operational support device and an operational support method for a nuclear power plant.

BACKGROUND ART

During operation and maintenance of a nuclear power plant, it is necessary to monitor and control the operating status and the safety status of the whole nuclear power plant and respective equipment constituting the nuclear power plant. Therefore, various monitoring devices and control devices are employed in nuclear power plants. A known monitoring device includes, for example, a large display device that is provided in a control room of the nuclear power plant so as to be visible from any place in the control room and personal display devices for operators, and each of the display devices provides a required display in accordance with the operating state, the level of emergency, and the level of importance. For example, the control device enables various types of control operations by applying a display device, such as a CRT display or liquid crystal display, to an operating console, and by performing a mouse operation or a touch operation on this display device.

An example of the monitoring device of such a nuclear power plant is the technology disclosed in PTL 1, in which information about the nuclear power plant is layered, where information in the upper layers is always displayed, and information in the middle or lower layers is displayed on a plurality of displays, and the displayed images are arranged, thereby allowing the state of the whole plant to be understood.

In a nuclear power plant, for example, in the event of an abnormality, such as tripping of a nuclear reactor, activation of an emergency core cooling system (ECCS), and so forth, the operator is required to perform many tasks immediately, such as collecting information related to safety-related systems, checking the state of the power plant, and so forth.

CITATION LIST

Patent Literature

{PTL 1} Japanese Unexamined Patent Application, Publication No. 2000-249782

SUMMARY OF INVENTION

Technical Problem

However, the information indicating the safety status, required by the operator, may not necessarily be displayed at all times on the display devices and monitoring devices that are employed in a highly computerized nuclear power plant. Therefore, there is a problem that, in the event of an abnormality in the nuclear power plant, it may take a long time to ascertain the safety status of the nuclear power plant, i.e., in which piece of equipment the abnormality occurs, what kind of abnormality occurs, and so forth. In addition, there are other problems; for example, even if operations performed by the operator are restricted due to maintenance of facilities critical for safety, the operator is unaware of that situation.

The present invention has been conceived to solve the problems described above, and an object thereof is to provide an operational support device and an operational support method in which it is possible to accurately ascertain the state of a nuclear power plant and which can assist an operator in performing prescribed operations immediately after the occurrence of an abnormality.

Solution to Problem

In order to solve the aforementioned problems, the present invention employs the following solutions.

A first aspect of the present invention is an operational support device of a nuclear power plant comprising: an operating-status confirming display unit that displays whether a system or equipment required for operating the nuclear power plant is functioning in accordance with a command signal for the system or the equipment; and a bypassed-and-inoperable state display unit that displays whether the system or the equipment is operable.

According to the first aspect of the present invention, prescribed command signals from the control device etc. of the nuclear power plant are compared and verified with predetermined design conditions during the operation of the nuclear power plant regularly or continuously. As a result, the operating-status confirming display unit display whether the system and the equipment required for operating the nuclear power plant are properly functioning in accordance with a prescribed command signal. By doing so, for example, in the event of an abnormality that risks the safety in any of the nuclear power plant, it is possible for an operator to understand immediately which system or equipment has caused the abnormality etc., and to take countermeasures against the abnormality at an early stage. In addition, because the bypassed-and-inoperable state display unit also displays whether, at that time, these systems and equipment are in a state where they are operable by the operator, it is possible for the operator to understand immediately the operability of the systems and equipment in question. As described above, even in the event of an abnormality, it is possible to support the operator such that they can perform a prescribed operation immediately. On the operating-status confirming display unit or the bypassed-and-inoperable state display unit, for example, it is possible to set, as the displayed items, items such as names of the system and the equipment required for safely operating the whole nuclear power plant and names of the command signals to the system and the equipment, and to display characters and symbols indicating their states.

In the above-mentioned first aspect of the present invention, the operating-status confirming display unit displays whether the system or the equipment is functioning in accordance with a trip signal for at least one of a nuclear reactor, a turbine, and a generator.

By doing so, for the safety of the nuclear power plant, in the event of an accident in the nuclear reactor, the turbine, or the generator, which are especially critical systems and equipment, it is possible to allow the operator to immediately understand the fact that the abnormality occurs, and to help taking countermeasures against the abnormality at an early stage.

In the above-mentioned first aspect of the present invention, the bypassed-and-inoperable state display unit may display whether the nuclear reactor or the turbine is operable.

By doing so, for the safety of the nuclear power plant, even in the event of an abnormality in the nuclear reactor or the turbine, which is especially critical system and equipment, it is possible to support the operator such that they can perform a prescribed operation immediately.

In the above-mentioned first aspect of the present invention, the bypassed-and-inoperable state display unit may display a maintenance or an inspection state of an emergency generator or safety injection pump during the operation of the nuclear power plant.

By doing so, it is possible to allow the operator to understand the state of maintenance or inspection, such as a state where maintenance or inspection of the emergency generator or the safety injection pump is under progress during the operation of the nuclear power plant etc. Therefore, it is possible to ensure the operational support for the operator, such that it is possible to avoid an inadvertent operation etc., and at the same time, to secure the safety of the worker performing the maintenance or inspection.

In the above-mentioned first aspect of the present invention, the operating-status confirming display unit may displays all operating states of the system or the equipment that are displayed on the operating-status confirming display unit in the form of a list.

By doing so, it is possible to visually check all of the operating states of the system or the equipment displayed on the operating-status confirming display unit easily without the need for an operation such as displaying the required information and the desired information; therefore, it is possible to provide required information to the operator immediately, and to support him or her such that the required operation can be performed.

In the above-mentioned first aspect of the present invention, the operating-status confirming display unit and the bypassed-and-inoperable state display unit may be displayed side-by-side.

By doing so, in combination with or in comparison with the operating state of the system or the equipment displayed on the operating-status confirming display unit, it is possible to understand easily and immediately if the system or the equipment is in a state operable by the operator, and therefore it is possible to provide required information to the operator even more immediately, and to support him or her such that required operation can be performed.

A second aspect of the present invention is an operational support method of a nuclear power plant, comprising: displaying whether a system or equipment required for operating the nuclear power plant is functioning in accordance with a command signal for the system or the equipment, and displaying whether the system or the equipment is operable.

Advantageous Effects of Invention

According to the present invention, it is possible to accurately ascertain the state of a nuclear power plant, and to assist an operator in performing prescribed operations immediately after the occurrence of an abnormality.

BRIEF DESCRIPTION OF DRAWINGS

FIG. 3 is a diagram showing an example of a display screen of the operational support device of the present invention.

DESCRIPTION OF EMBODIMENTS

An embodiment of an operational support device according to the present invention will be described below with reference to the drawings.

Figure 1:
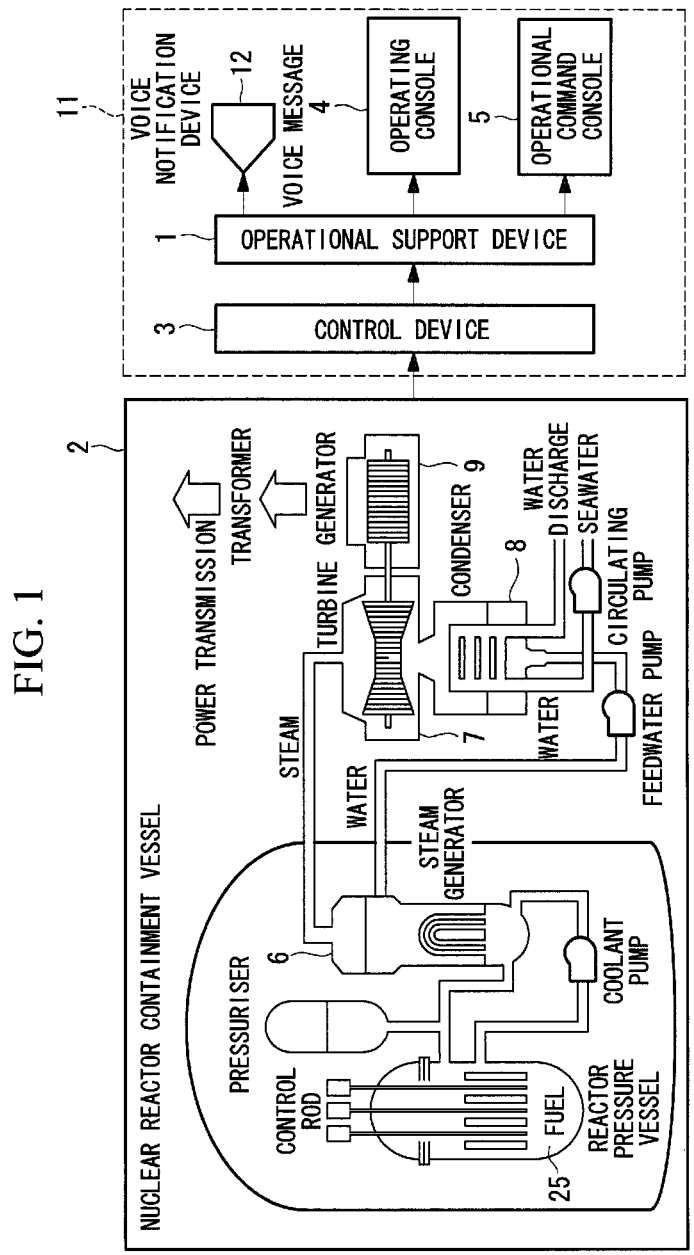
FIG. 1 is a block diagram showing, in outline, the configuration of a nuclear power plant to which an operational support device of the present invention is applied.

In this embodiment, an example in which an operational support device is applied to a nuclear power plant employing a pressurized water reactor (PWR: Pressurized Water Reactor) will be described. FIG. 1 is a block diagram showing, in outline, a configuration in which an operational support device 1 according to this embodiment is applied to a nuclear power plant, and FIG. 2 is a reference diagram showing, in outline, the configuration of a control room of a nuclear power plant 2.

Figure 2:
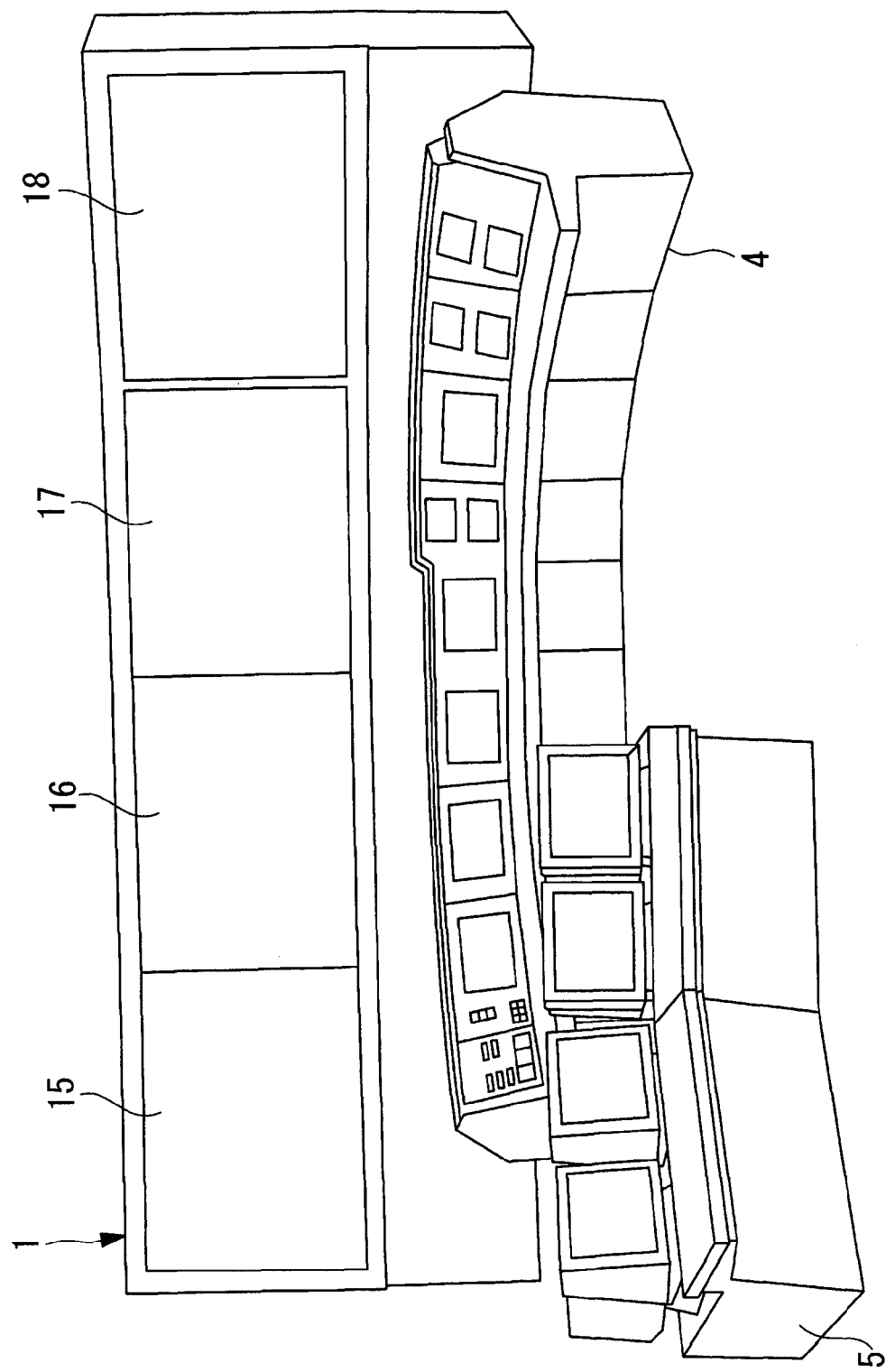
FIG. 2 is a reference diagram showing, in outline, the configuration of a control room of the nuclear power plant to which the operational support device of the present invention is applied.

As shown in FIGS. 1 and 2, the operational support device 1 is disposed in a control room 11 of the nuclear power plant and is connected to the nuclear power plant 2 via a control device 3 for running and controlling the nuclear power plant 2. The operational support device 1 is connected to an operating console 4, an operational command console 5, and a voice notification device 12.

The nuclear power plant 2 is mainly constructed of a reactor vessel 25, a steam generator 6, a turbine 7 (high-pressure turbine and low-pressure turbine), a condenser 8, and a generator 9. The reactor vessel 25 is a vessel accommodating a reactor core, and decay heat is extracted by circulating coolant around the nuclear fuel in the reactor vessel 25. In the reactor vessel, the reactor core, a core barrel that surrounds the reactor core, a core baffle, and a supporting structure of a fuel assembly are provided. The steam generator 6 generates steam using the heat extracted from the reactor vessel 25 and supplies the steam to the high-pressure turbine of the turbine 7. The high-pressure turbine rotates a shaft directly connected to the generator 9 by the high-pressure steam supplied from the steam generator 6 and supplies the discharged air via a moisture separator reheater to the low-pressure turbine of the turbine 7. The low-pressure turbine is driven by the steam that has been discharged from the high-pressure turbine and dried and reheated by the moisture separator reheater and rotates a shaft of a generator. The condenser 8 condenses the steam used in the high-pressure turbine and the low-pressure turbine into water to reduce its volume, thereby achieving a high vacuum state to increase the efficiency of the turbines. The generator 9 converts the rotating force of the shaft that is driven by the turbine 7 into electrical power, and outputs the power.

The turbine 7 may have a multi-stage configuration including a high-pressure configuration and a low-pressure configuration or a medium-pressure configuration.

The control device 3 operates or controls the respective systems and equipment constituting the nuclear power plant 2 according to predetermined design conditions, and the control device 3 sends, to the operational support device 1, digital signals indicating process parameters of the nuclear reactor, such as the water level, pressure, flow rate, and so forth, and the states of the respective systems and equipment, and various signals, such as command signals, operation signals, and alarm signals, to the respective systems and equipment. General-purpose or specialized computers can be employed as the control device 3. Such computers (not shown) are provided with a CPU (central processing unit), ROM (Read Only Memory), RAM (Random Access Memory), and so forth. The control device 3 stores, for example, programs, the design conditions, and so forth for operating or controlling the respective systems and equipment of the nuclear power plant 2 in ROM etc. in advance; reads out these programs and the design conditions with the CPU etc. in accordance with the signals from the operating console 4, which will be described below, and the signals from the various sensors etc. provided on the respective systems and equipment; loads them in the RAM; and executes information processing/computational processing, thereby operating or controlling the respective systems and equipment.

The operational support device 1 is provided with four display units 15, 16, 17, and 18 for enabling the operator to easily understand the state of the nuclear power plant 2 and for supporting the plant operation. The display units 15, 16, 17, and 18 are disposed adjacent to each other so as to form, as a whole, a large display device that can be viewed from any place in the control room. In the event of, for example, normal operation, abnormal operation, or an accident in the nuclear power plant 2, in order to understand the status of the whole nuclear power plant 2, the respective display units 15, 16, 17, and 18 help operators to immediately understand the state of the nuclear power plant 2 by displaying the state of the main system and equipment summarized in a diagram of the schematic configuration of the nuclear power plant 2 and by displaying typical alarms indicating an abnormality in accordance with the various signals sent from the control device 3.

In the operational support device 1, as shown in FIG. 3, any of the respective display units 15, 16, 17, and 18 displays an OK monitor 20 as an operating-status confirming display unit that displays whether the system and equipment required for safely operating the whole nuclear power plant are functioning in accordance with the command signals for the system and the equipment; and displays a BISI (Bypassed and Inoperable State Indication) monitor 21 as a bypassed-and-inoperable state display unit that displays whether the system and the equipment are operable.

The displayed items on the OK monitor 20 and the BISI monitor 21 are substantially the same, and so, in order to allow easy visual checking of these monitors by the operator, they are provided side by side. In the example shown in FIG. 3, as the displayed items on the OK monitor 20 and the BISI monitor 21, the signals related to the system and the equipment, which are required for safely operating the entire nuclear power plant, include RT (reactor trip signal), TT (turbine trip signal), GT (generator trip signal), SI Sequence (safety injection sequence signal), BO Sequence (blackout sequence signal), φA (containment vessel isolation signal (T signal)), CVI (containment vessel ventilation system isolation signal), CR Isol (central control room ventilation system isolation), φB (containment vessel isolation signal (P signal)), CS (containment vessel spray activation signal), FW Isol (main feedwater isolation signal), MS Isol (main steam isolation signal), and A F/W Pmp Act (auxiliary feedwater initiation signal).

The OK monitor 20 displays "OK" when the respective systems and equipment are functioning properly in accordance with these signals, and displays "NG (No Good)" when they are not functioning properly.

Each of the above-mentioned displayed items will be described below. RT (reactor trip signal) is a request signal for shutting down the nuclear reactor in the event of an abnormality or accident, and the operation based on this signal requires control rods to be completely inserted by opening a reactor trip breaker.

TT (turbine trip signal) is a request signal for shutting down the main turbine in the event of an abnormality or accident, and the operation based on this signal requires a turbine cutoff valve to be closed by reducing turbine emergency shutdown hydraulic pressure by opening a valve.

GT (generator trip signal) is a request signal for shutting down the main generator in the event of an abnormality or accident, and the operation based on the signal requires a generator load-break switch to be opened by opening a field circuit breaker of the main generator.

SI Sequence (safety injection sequence signal) is a request signal for injecting cooling water containing boric acid into the reactor core in the event of an accident, and the operation based thereon requires a valve to be opened/closed for ensuring water for activating a high-pressure/low-pressure injection pump and for water injection and then to perform sequential activation (activation at certain time intervals to avoid overload of the emergency generator) of the related auxiliary equipment (a nuclear-reactor auxiliary cooling-water pump etc.).

BO Sequence (blackout sequence signal) is a request signal for maintaining cooling of the reactor core when a power source external to the power plant is used (in the event of an accident in power transmission line etc.), and the operation based thereon requires a valve to be opened/closed for ensuring water for activating an auxiliary feedwater pump etc. and for water injection and then to further perform sequential activation (activation at certain time intervals to avoid overload of the emergency generator) of the related auxiliary equipment (the nuclear-reactor-auxiliary cooling-water pump etc.).

φA (containment vessel isolation signal (T signal)) is a request signal for closing a plurality of isolation valves in order to prevent the release of radiation from the containment vessel in the event of an accident, and the operation based thereon requires a valve to be closed for isolating the flow path (system) that may be a release path from the containment vessel.

CVI (containment vessel ventilation system isolation signal) is a request signal for closing an isolation valve and a damper of a plurality of ventilation and air conditioning systems in order to prevent the release of radiation from the containment vessel in the event of an accident, and the operation based thereon requires a valve and a damper to be closed for isolating the flow path (system) that may be a release path from the containment vessel.

CR Isol (central control room ventilation system isolation) is a request signal for activating/stopping a fan and for opening/closing a valve and a damper of a plurality of ventilation and air conditioning systems for preventing the radiation from entering a central control room in the event of an accident and establishing a safe air-circulation system, and the operation based thereon requires a fan to be activated/stopped and a valve and a damper to be set in the opened/closed state in a plurality of ventilation and air conditioning systems for preventing the radiation from entering the central control room and establishing a safe air-circulation system.

φB (containment vessel isolation signal (P signal)) is a request signal for closing a plurality of isolation valves in order to prevent, in the event of an accident, the release of radiation from the containment vessel while the containment vessel is performed the spraying operation, and the operation based thereon requires a valve to be closed for isolating the flow path (system) that may become a release path from the containment vessel.

CS (containment vessel spray activation signal) is a request signal for closing a plurality of isolation valves in order to cool the nuclear reactor/the containment vessel, in the event of an accident, by spraying water (spray) containing chemicals and boric acid from the top of the containment vessel to prevent the release of radiation, and the operation based theron requires a valve to be opened/closed for ensuring water for activating the containment vessel spray pump and for the spraying operation, and sequential activation of the related auxiliary equipment (the nuclear-reactor-auxiliary cooling-water pump etc.).

FW Isol (main feedwater isolation signal) is a signal for isolating a main feedwater system in order to prevent, in the event of an accident, excessive supply of water and over-cooling by the steam generator, and the operation based thereon requires the main feedwater pump to be forcedly stopped and a valve to be set in the closed state for isolating the main feedwater system.

MS Isol (main steam isolation signal) is a signal for isolating a main steam system in order to prevent, in the event of an accident, over-cooling by the steam generator, and the operation based thereon requires a main steam isolation valve, a bypass valve, and so forth to be set in the closed state.

A F/W Pmp Act (auxiliary feedwater initiation signal) is a signal for activating an auxiliary feedwater system for ensuring the removal of heat with the steam generator in response to the isolation of the main feedwater in the event of an accident, and the operation based thereon requires an electric/turbine-actuated auxiliary feedwater pump to be activated, and the lineup state of the valve to be checked in order to isolate the auxiliary feedwater system.

In accordance with the above-mentioned signals, the OK monitor 20 displays "OK" when the required operation in response to the signals has been performed properly, and displays "NG" when the operation has not been performed properly. In other words, these signals are sent to the control device 3, and the control device 3 compares and verifies them with predetermined design conditions etc. As a result, the control device 3 sends, to the operational support device 1, a control signal that asks "OK" to be displayed if the required operation has been performed properly and a control signal that asks "NG" to be displayed if the required operation has not been performed properly. In the OK monitor 20, the OK monitor 20 displays "OK" or "NG" in accordance with this control signal. When the above-mentioned signals are not sent, the OK monitor 20 displays "–".

In the BISI monitor 21, regarding the status indicating whether a system or equipment is operable, "–" is always displayed in an operable state, and "NG" is displayed in an inoperable state. A state in which the operability is unknown includes a bypass operation due to maintenance or inspection or a malfunction, a forced stoppage state due to a malfunction etc. of equipment, cutoff of control power, switching the control to a local panel etc., and so forth: these states constitute the information used by an operator for constantly understanding the status in the power plant, and the information needs to be handed over and checked when the operators are changed.

In other words, the control device 3 determines, regularly or continuously, the state of the respective systems and equipment by receiving the signals from various sensors etc. provided on the respective systems and equipment. As a result, regarding the status indicating whether each system or equipment is inoperable, the control device 3 sends, to the operational support device 1, the control signal that asks "–" to be displayed if the respective systems and equipment are operable, and the control signal that asks "NG" to be displayed if the respective systems and equipment are inoperable. In accordance with this control signal, the BISI monitor 21 displays "–" or "NG".

When "NG" is displayed on the BISI monitor 21, the system and the equipment showing "NG" are in the inoperable state, and this includes, for example, a state where the inoperable is caused by a malfunction, in addition to a state where the inoperability is due to maintenance or inspection.

In particular, if maintenance or inspection of the emergency generator or the safety injection pump is to be performed during the operation of the nuclear power plant 2, in order to ensure the safety of workers performing maintenance or inspection, "NG" is displayed in the BO Sequence or SI Sequence field, and information notifying the inoperable state is provided to the operator. A diesel generator or a gas turbine generator is employed as the emergency generator. In addition, because maintenance or inspection work during the operation of the nuclear power plant 2 can include, for example, maintenance or inspection work on control panels, protection circuits, and so forth, these items can be set as the displayed items on the BISI monitor 21 as required.

The indication "NG" can be displayed together with more details of the state by, for example, changing the background color of the indication depending on the degree of inoperability. In other words, because the nuclear power plant is designed to ensure safety with redundant multiple series of devices and systems that operate in the event of an abnormality or accident, yellow is used if only one series thereof is inoperable, and red is used if two or more series are inoperable. By doing so, it is possible to expect an advantage in that, when red is used, a notification indicating that the inoperable state causes an adverse effect on the actual safety of the plant is given, and in addition, when yellow is used, a notification indicating that an even more inoperable state causes an adverse effect on the safety status is given. Flashing signs may be employed for the display of the notification and an abnormality warning signal.

The operating console 4 enables complete monitoring and control of the nuclear power plant 2 by the operator, and it is a terminal capable of checking all information of the nuclear power plant 2. Details of the operations performed by the operator are sent from the operating console 4 to the control device 3, and a prescribed control signal is sent from the control device 3 to the nuclear power plant 2 in accordance with the details of the operations, thereby achieving the desired control.

Although the operational command console 5 has some restrictions on the operations regarding running of the nuclear power plant 2, unlike the operating console 4, in order to achieve smooth communication with the operator of the operating console 4 it is possible to, for example, display pictures that are in common with the operational command console 5 on the operating console 4. Therefore, it is possible to control and supervise the operator who is operating the operating console 4, by using the operational command console 5.

In the event of an abnormality in the nuclear power plant 2, in addition to the beeping sound or flashing sign that notifies the occurrence of abnormality, the voice notification device 12 uses voice to tell the operator the details of the abnormality.

As described above, according to the present invention, during the operation of the nuclear power plant 2, the OK monitor 20 displays "OK" or "NG" in the form of a list indicating whether the systems and the equipment required for safely operating the whole nuclear power plant 2 are functioning properly in accordance with the command signals for these systems and the equipment. Therefore, in the event of an abnormality that risks the safety in the nuclear power plant 2, it is possible for the operator to understand immediately and easily which system or equipment has caused the abnormality etc., and to take countermeasures against the abnormality at an early stage. In addition, because the BISI monitor 21 also displays "–" or "NG" to indicate whether, at that time, these systems and equipment are in a state where they are operable by the operator, it is possible for the operator to understand immediately the operability of the systems and equipment in question. Since the BISI monitor 21 also displays "NG" for an inoperable state due to maintenance and inspection work during the operation of the nuclear power plant 2 to provide the operator with information indicating that the systems and equipment in question are inoperable, it is possible to ensure the safety of the worker performing maintenance or inspection. As described above, even in the event of an abnormality, it is possible to support the operator such that they can perform a prescribed operation immediately.

In this embodiment, although an example in which "OK", "NG", and "–" are displayed on the OK monitor 20 and the BISI monitor 21 has been described, it is possible to display them using other characters or colors. Additionally, it is possible to notify an operator with a signal that is recognizable to the operator, such as an acoustic signal etc.

In this embodiment, although the operational support device has been described as being applied to a PWR, it should be naturally appreciated that application to a boiling water reactor (BWR: Boiling Water Reactor, BWR) is possible. The displayed items on the OK monitor 20 and the BISI monitor 21 are not limited to the examples in this embodiment, and appropriate selection is permissible on the basis of the system and the equipment provided in the nuclear power plant to which the operational support device according to the present invention is to be applied.

The present invention is not limited to the above-described embodiment. Suitable design modifications are permissible as necessary. The respective elements in the above embodiment include those easily conceivable by a person of ordinary skill in the art and those that are substantially equivalent thereto.

REFERENCE SIGNS LIST 1 operational support device
2 nuclear power plant
3 control device
11 control room
15, 16, 17, 18 display unit
20 OK monitor
21 BISI monitor

The invention claimed is:

1. An operational support device of a nuclear power plant comprising:
   an operating-status confirming display,
   an operating-status confirming unit,
      wherein the operating-status confirming unit is configured to cause the operating-status confirming display to display, in a form of a list, a respective command identifier for each of a plurality of command signals, wherein the plurality of the command signals include two or more command signals selected from:
         a reactor trip signal,
         a turbine trip signal,
         a generator trip signal,
         a safety injection sequence signal,
         a blackout sequence signal,
         a first containment vessel isolation signal,
         a containment vessel ventilation system isolation signal,
         a central control room ventilation system isolation signal,
         a second containment vessel isolation signal, wherein the second containment vessel isolation signal differs from the first containment vessel isolation signal,
         a containment vessel spray activation signal,
         a main feedwater isolation signal,
         a main steam isolation signal, and
         an auxiliary feedwater initiation signal;
      wherein the operating-status confirming unit is configured to cause the operating-status confirming display to display for each respective given command signal, whether respective system or equipment
         which is required for operating the nuclear power plant, and
         which is to be functioning in response to a respective given command signal associated with that respective system or equipment,
         is properly contributing to an expected result which is in accordance with that respective given command signal;
   a bypassed-and-inoperable state display,
   a bypassed-and-inoperable state unit,
      wherein the bypassed-and-inoperable state unit is configured to cause the bypassed-and-inoperable state display to display whether that respective system or equipment is currently inoperable to properly function in accordance with that respective given command signal;
   wherein the operating-status confirming unit and the bypassed-and-inoperable state unit are configured to operate to cause simultaneous displays,
   wherein the operating-status confirming display and the bypassed-and-inoperable state display are located side-by-side,
      wherein the operating-status confirming display is arranged to display next to a displayed first command identifier, a first operational indication of whether a respective first system or equipment is properly functioning in accordance with a respective given command signal associated with the first command identifier,
      wherein the bypassed-and-inoperable state display is arranged to display next to the displayed first operational indication, a first status indication of whether that respective first system or equipment is currently inoperable to properly function in accordance with the respective given command signal associated with the first command identifier.

2. The operational support device of a nuclear power plant according to claim 1, wherein the operating-status confirming unit is configured to cause the operating-status confirming display to display whether the system or the equipment is functioning in accordance with a trip signal for at least one of a nuclear reactor, a turbine, and a generator.

3. The operational support device of a nuclear power plant according to claim 1, wherein the bypassed-and-inoperable state display unit is configured to cause the bypassed-and-inoperable state display to display whether a nuclear reactor or a turbine of the nuclear power plant is operable.

4. The operational support device of a nuclear power plant according to claim 1, wherein the bypassed-and-inoperable state display unit is configured to cause the bypassed-and-inoperable state display to display a maintenance or an inspection state of an emergency generator or safety injection pump during the operation of the nuclear power plant.

5. The operational support device of a nuclear power plant according to claim 1, wherein the operating-status confirming display and the bypassed-and-inoperable state display are positioned side-by-side.

6. An operational support method of a nuclear power plant comprising:
   (a) displaying, in a form of a list, a respective command identifier for each of a plurality of command signals, wherein the plurality of the command signals include
      two or more command signals selected from:
      a reactor trip signal,
      a turbine trip signal,
      a generator trip signal,
      a safety injection sequence signal,
      a blackout sequence signal,
      a first containment vessel isolation signal,
      a containment vessel ventilation system isolation signal,
      a central control room ventilation system isolation signal,
      a second containment vessel isolation signal,
         wherein the second containment vessel isolation signal differs from the first containment vessel isolation signal,
      a containment vessel spray activation signal,
      a main feedwater isolation signal,
      a main steam isolation signal, and
      an auxiliary feedwater initiation signal;
   (b) displaying for each respective given command signal, whether respective system or equipment which is required for operating the nuclear power plant, and which is to be functioning in response to a respective given command signal associated with that respective system or equipment, is properly contributing to an expected result which is in accordance with that respective given command signal,
      wherein (b) includes electronically displaying next to a displayed first command identifier, a first operational indication of whether a respective first system or equipment is properly functioning in accordance with a respective given command signal associated with the first command identifier; and
   (c) simultaneous with (b), displaying whether that respective system or equipment is currently inoperable to properly function in accordance with that respective given command signal,
      wherein (c) includes electronically displaying next to the displayed first operational indication, a first status indication of whether that respective first system or equipment is currently inoperable to properly function in accordance with the respective given command signal associated with the first command identifier.

* * * * *